United States Patent [19]

Anderson et al.

[11] Patent Number: 4,631,751

[45] Date of Patent: Dec. 23, 1986

[54] METHOD FOR ENLARGING A BINARY IMAGE

[76] Inventors: Karen L. Anderson, A4 Hudson View Estates, Lakeview Dr., Peekskill, N.Y. 10566; Frederick C. Mintzer, 3798 Oriole Ct., Shrub Oak, N.Y. 10588; Gerald Goertzel, 7 Sparrow Cir., White Plains, N.Y. 10605

[21] Appl. No.: 664,190

[22] Filed: Oct. 24, 1984

[51] Int. Cl.$^4$ .............................................. G06K 9/42
[52] U.S. Cl. ..................................... 382/47; 340/731; 358/287; 382/44; 382/46
[58] Field of Search .................. 382/47, 46, 54, 44; 358/287, 22; 340/731, 723, 727

[56] References Cited

U.S. PATENT DOCUMENTS

| | | | |
|---|---|---|---|
| 3,976,982 | 8/1976 | Eiselen | 382/47 |
| 4,129,860 | 12/1978 | Yonezawa et al. | 340/731 |
| 4,168,488 | 9/1979 | Evans | 382/46 |
| 4,271,476 | 6/1981 | Lotspiech | 382/46 |
| 4,283,765 | 8/1981 | Rieger | 382/47 |
| 4,468,688 | 8/1984 | Gabriel et al. | 358/22 |
| 4,545,069 | 10/1985 | Kermisch | 340/727 |

Primary Examiner—Leo H. Boudreau
Assistant Examiner—Joseph Mancuso

[57] ABSTRACT

A method for enlarging a binary image by an arbitrary factor includes the steps of storing the image in bit sequence; rotating the image in a first direction by ninety degrees; inserting one or more rows of expansion bits along the original horizontal axis of the image to convert i rows of bits to j rows of bits where $i<j<=2i$; assigning a value to each expansion bit generated by the above step; repeating the steps of inserting and assigning a predetermined number of times to achieve an enlargement by a factor F1 along said original horizontal axis; rotating the image in a second direction opposite said first direction by ninety degrees; inserting one or more rows of expansion bits along the vertical axis of the image to convert i rows of bits to j rows of bits where $i<j<=2i$; assigning a value to each expansion bit generated by the above step; repeating the steps of inserting and assigning a predetermined number of times to achieve an enlargement by a factor F2 along said vertical axis; storing the enlarged image generated by the above steps.

14 Claims, 5 Drawing Figures

Steps of the Expansion Process

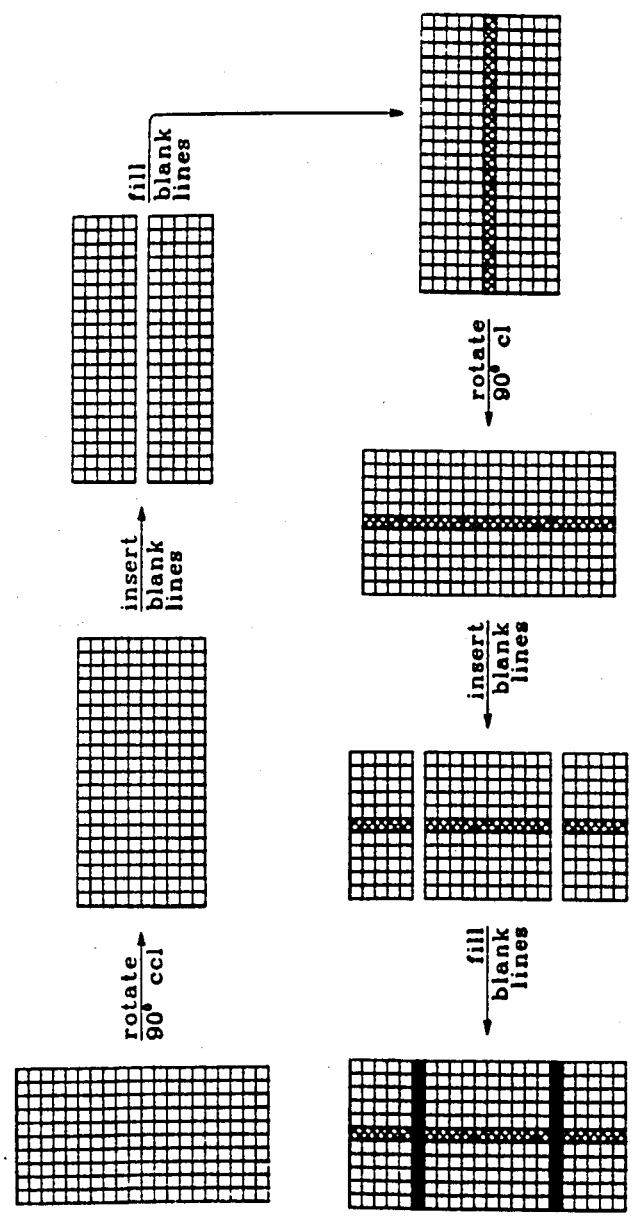
FIG 1. Steps of the Expansion Process

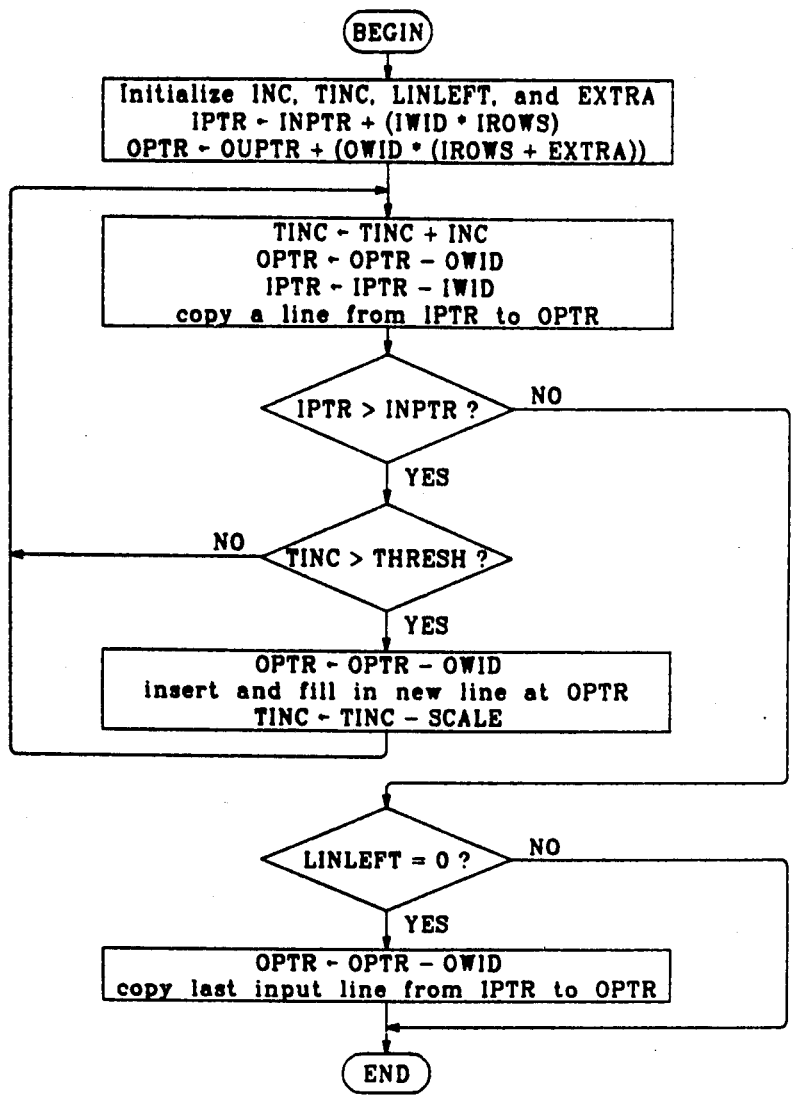
FIG 2. Flow Chart for Vertical Enlargement

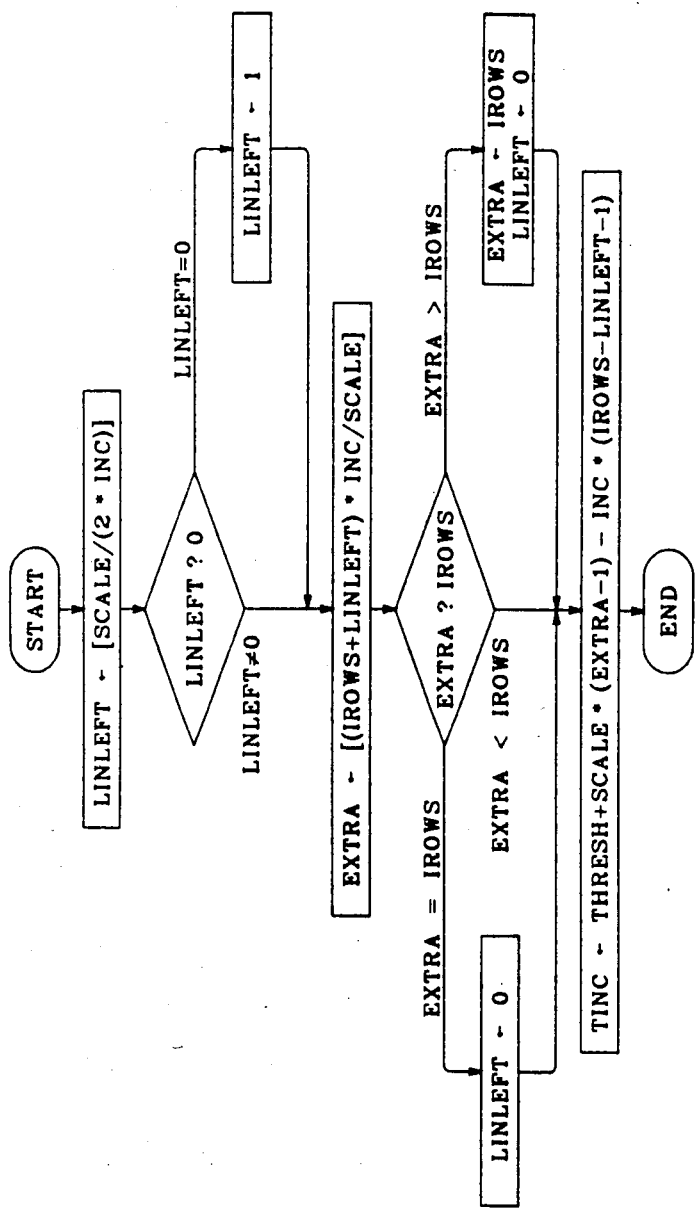
FIG. 3. Flow Chart for Parameter Initialization

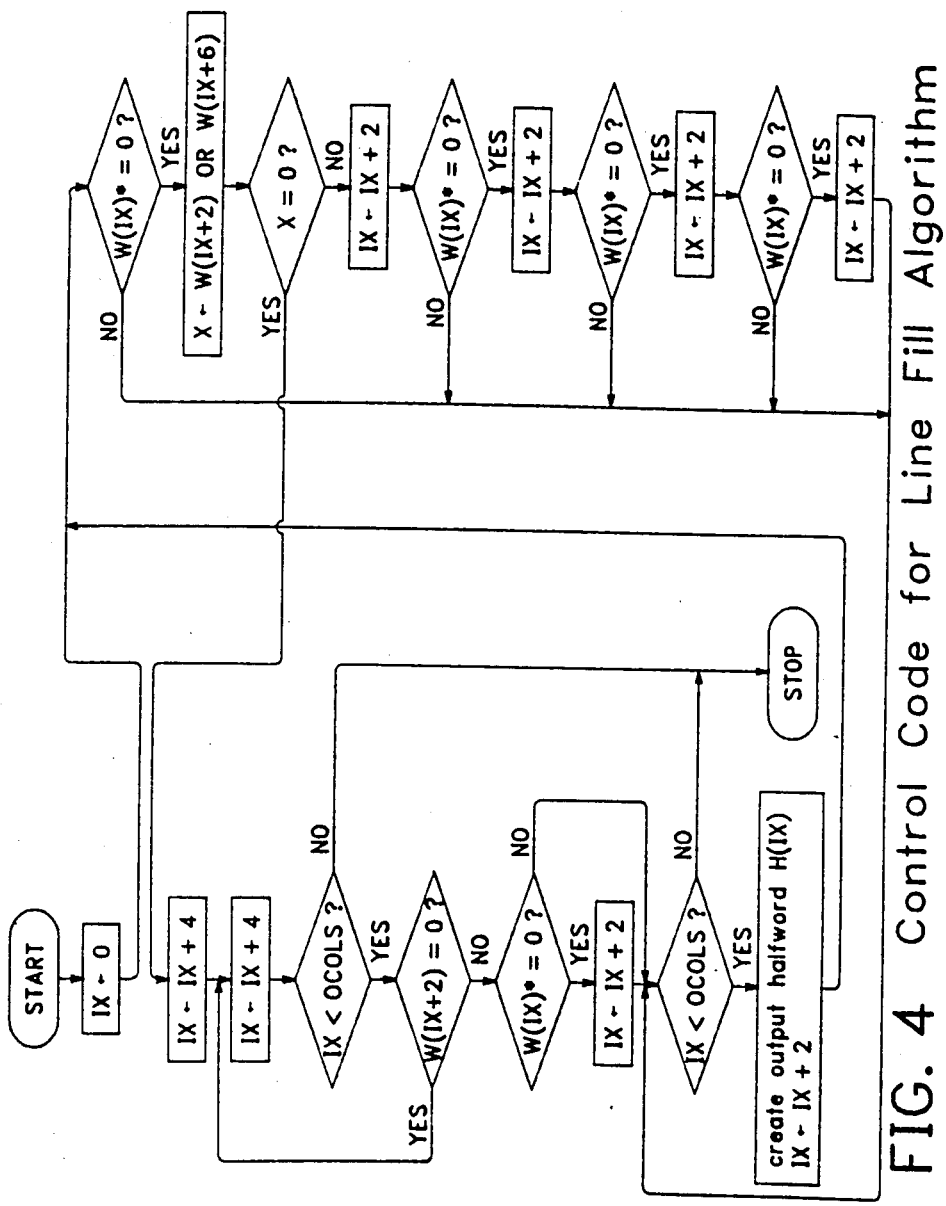
FIG. 4 Control Code for Line Fill Algorithm

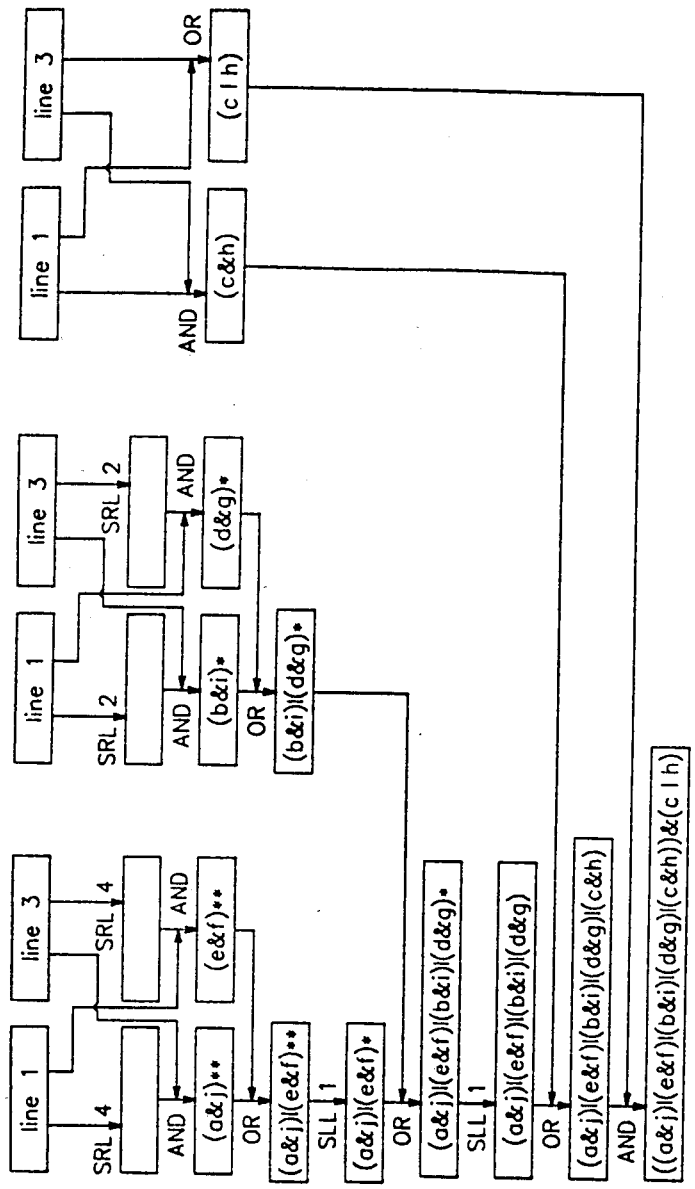
FIG 5. Algorithm to Fill In Inserted Lines

METHOD FOR ENLARGING A BINARY IMAGE

BACKGROUND OF THE INVENTION

1. Field of the Invention

The present invention relates to binary digital image processing methods and more particularly to improved methods for enlarging binary digital images.

2. Description of the Prior Art

The following are systems representative of the prior art.

K. L. Anderson, F. C. Mintzer, and J. L. Mitchell, in U.S. Pat. No. 4,569,081 "Fast algorithm for enlarging an image by 1/5 in both dimensions,", assigned to a common assignee, teach a method for expanding a binary image including the steps of: storing the image in bit sequence; inserting for each string of 5 bits along a first axis one or more expansion bits, to convert each said string of 5 bits to a string of 6 bits; assigning a value to each expansion bit generated by the above step; inserting one or more rows of expansion bits for each 5 rows of bits along a second axis of the image to convert each 5 rows of bits to 6 rows of bits along the second axis of the image; assigning a value to each expansion bit generated by the above steps; storing the enlarged image generated by the above steps.

This prior art system is a precursor to the present invention. Although the patent does deal with expansion of an image by a factor of 1.2 which is between 1.0 and 2.0, the patent does not show an interactive system in which an operator may select an expansion factor and which includes the steps of rotating the image, inserting blank rows in the image to convert i rows of bits to j rows of bits where $i<j<=2i$ and assigning a value to each bit in each inserted row.

U.S. Pat. No. 4,303,948 describes an image enlargement process. The enlargement procedure differs from the method of the present invention in that it is a two-step process: the image is first expanded by an integer factor and then reduced by a fractional factor. Expansion is accomplished by merely replicating bits, whereas the present invention interpolates to obtain the bit values placed in an inserted row. Since the reduction algorithm of the patent does not accomodate an arbitrary reduction factor, the expansion algorithm also only handles a rather limited set of expansion factors. In the method of the present invention, any expansion factor can be closely approximated, although in some cases it may be necessary to apply the algorithm more than once. The patented expansion algorithm applies the same expansion factor in both the horizontal and vertical dimensions. The method according to the present invention expands in one dimension. To expand in both dimensions it is necessary to rotate the image 90 degrees, expand vertically (to get the horizontal expansion), rotate the image back to its original orientation, and then expand vertically again. Thus it is trivial to have different expansion factors for the horizontal and vertical axes. The patented algorithm requires two page memories; it apparently does not allow expansion in situ.

U.S. Pat. No. 4,254,409 describes an image enlargement process designed to do page composition using alphanumerics and simple graphics, rather than to operate on an already-composed image containing arbitrary data. It assumes that objects in the image are described as a series of graphics elements, each of which has a corresponding precanned procedure for enlarging it. It thus assumes some knowledge about what the image represents.

U.S. Pat. No. 4,409,591 is similar to U.S. Pat. No. 4,254,409. It operates only on a specified set of coded symbols (basically alphanumerics) rather than on arbitrary image data. Like U.S. Pat. No. 4,254,409, it assumes that the characters are described as a series of graphics elements; in this case enlargement is done by having precanned dot patterns available to create each element at any of a finite number of larger sizes.

U.S. Pat. No. 4,367,533 describes enlargement of images by a process which appears to be replication of pixels.

U.S. Pat. No. 4,357,604 describes a hardware method for enlarging the dot patterns corresponding to coded characters (not image data, although the image could be represented as coded data using a programmable symbol set) prior to display. The enlargement factor appears to be restricted to integer values. Enlargement is by replicating pels in one dimension and by leaving extra space between pel columns in the other dimension.

U.S. Pat. No. 4,267,573 operates by transforming images (e.g. to a log spiral coordinate system). This is much more complex than the method of the present invention.

U.S. Pat. No. 4,153,896 scales the image first in one dimension and then in the other. This patent relies on hardware, that it describes, to read an image in either scan dimension, so that the rotations do not actually have to be performed. It is not appropriate for direct implementation in software, since most computers do not have this hardware capability. It is capable of scaling (enlarging or reducing) by an arbitrary factor. The enlargement algorithm is equivalent to replicating pels.

Although the prior art discussed above relates generally to the field of the present invention, none of the art teaches nor suggests the method of the present invention.

SUMMARY OF THE INVENTION

Therefore, it is an object of the present invention to enlarge a binary image by an arbitrary factor by a method which includes the steps of storing the image in bit sequence; rotating the image in a first direction by ninety degrees; inserting one or more rows of expansion bits along the original horizontal axis of the image to convert i rows of bits to j rows of bits where $i<j<=2i$; assigning a value to each expansion bit generated by the above step; repeating the steps of inserting and assigning a predetermined number of times to achieve an enlargement by a factor F1 along said original horizontal axis; rotating the image in a second direction opposite said first direction by ninety degrees; inserting one or more rows of expansion bits along the vertical axis of the image to convert i rows of bits to j rows of bits where $i<j<=2i$; assigning a value to each expansion bit generated by the above step; repeating the steps of inserting and assigning a predetermined number of times to achieve an enlargement by a factor F2 along said vertical axis; storing the enlarged image generated by the above steps.

It is another object of the present invention to enlarge a binary image by the method set out above wherein the step of storing the enlarged image comprises assigning the enlarged image to an area of storage beginning at the same position as the area of storage in which said image was originally stored.

It is another object of the present invention to enlarge a binary image by the method set out above wherein the step of storing the enlarged image comprises assigning the enlarged image to an area of storage separate from an area of storage in which said image was originally stored.

The foregoing and other objects, features and advantages of the invention will be apparent from the more particular description of the preferred embodiments of the invention, as illustrated in the accompanying drawing.

BRIEF DESCRIPTION OF THE DRAWING

FIG. 1 is an illustration of the image enlargement process according to the present invention.

FIG. 2 is a flow chart of the vertical expansion method required for image enlargement according to the present invention.

FIG. 3 is a flow chart of the parameter initializations required for image enlargement according to the present invention.

FIG. 4 is a flow chart showing the method for assigning values to bits in inserted lines according to the present invention.

FIG. 5 is a flow chart showing the method for calculating values of bits in inserted lines according to the present invention.

In the drawing, like elements are designated with similar reference numbers, and identical elements in different specific embodiments are designated by identical reference numbers.

DESCRIPTION OF PREFERRED EMBODIMENTS OF THE INVENTION

This invention solves the problem of quickly enlarging a binary digital image, in an electronic data processing system such as an IBM 3081, by an arbitrary factor F. The image to be enlarged is assumed to be a binary image, e.g., 1 bit per pel. Furthermore, the image is assumed to be stored with 8 pels packed into each byte, and each line of the image is assumed to begin on a byte boundary.

The image enlargement method according to the present invention includes the following combination of steps.
 1. The image is rotated counter-clockwise by 90 degrees.
 2. The resultant image is enlarged vertically by Fh.
 3. The resultant image is rotated by 90 degrees clockwise.
 4. The resultant image is enlarged vertically by Fv.

The steps of the process are illustrated in FIG. 1.

The process is described in greater detail below.

. The enlargement may take place either in-place or not-in-place. If the enlargement is not-in-place, the output image is required to not intersect the input image. (Otherwise writing the output image might destroy input data needed to complete the image enlargement).

A fast algorithm, described in commonly assigned, co-pending U.S. patent application Ser. No. 567214 of F. C. Mintzer, G. Goertzel, J. L. Mitchell, and K. L. Anderson, "Fast algorithm for rotating an image by 90 degrees," may be used to perform the 90 degree rotations of steps 1 and 3.

Steps 2 and 4 use one or more applications of a method for enlarging a binary image in the vertical dimension by an arbitrary factor F such that $1.0 <= F <= 2.0$. This method operates by inserting blank rows in the image under the control of a counter and then assigning values to the bits in the inserted rows in accordance with a line full algorithm to be described below. The method for inserting blank lines is illustrated in FIG. 2. The following variables are used:

INPTR gives the address of the beginning of the original (input) image.

OUPTR gives the address of the beginning of the enlarged (output) image.

IPTR addresses the rows of the original image during the enlargement process.

OPTR addresses the rows of the output image during the enlargement process.

IWID gives the distance in bytes from the beginning of one input image line to the beginning of the next.

OWID gives the distance in bytes from the beginning of one output image line to the beginning of the next.

IROWS gives the number of lines in the input image.

SCALE is an integer constant. In the preferred embodiment of the invention SCALE was chosen to be 25200.

THRESH is an integer constant. Its value is $(SCALE/2)-1$.

TINC is the counter which controls the line insertion.

INC is the value by which the counter TINC is to be incremented for each input line examined.

EXTRA is the number of lines to be inserted.

LINLEFT is the number of input image lines to be copied to the output image after the last blank line is inserted.

The first step is the initialization of INC, EXTRA, LINLEFT, and the counter TINC. This is described in greater detail below. IPTR and OPTR are then positioned at the ends of the input and output images, respectively. By working from the ends of the images back toward the beginning, an enlargement in situ may be performed without any danger of destroying input data before it is used. (The input and output images are not permitted to overlap if enlargement is not to be performed in situ).

The main loop of the enlargement algorithm increments the counter TINC by INC, backs up IPTR and OPTR to point to the next available input and output lines, and copies the input line into the output image. IPTR is then compared to INPTR. If IPTR is greater than INPTR, more input lines remain to be processed; otherwise the loop is exited. If additional input lines remain, TINC is compared to THRESH to determine if it is time to insert a line. If so, OPTR is backed up to point to the position where the line is to be inserted and a row of zero (white) bits is placed in the output image. The inserted row is the modified according to a procedure to be described below to add one (black) bits as required. TINC is decremented by SCALE and the main loop repeats.

On exit from the main loop, LINLEFT is tested to see if it is zero. If so, the enlargement doubled the size of the image and it is necessary to insert one more line at the beginning of the output image. OPTR is backed up, and a second copy of the last input line processed is placed in the output image.

FIG. 3 shows the procedure for calculating INC, EXTRA, and LINLEFT and initializing the counter TINC. INC is first computed as the rounded value of $(F-1.0)*SCALE$, where F is the enlargement factor (a real number in the range 1.0 to 2.0, inclusive). If this value is zero, then the enlargement factor is so small relative to the number of lines in the original image that no lines will have to be inserted (no enlargement occurs); in this case the original image must be copied to the output image area if the enlargement is not in situ, and no further work is required.

LINLEFT, the number of input image lines to be copied into the beginning of the output image after the last line is inserted, is calculated as the truncated value of one-half of the period of the line insertions (e.g. if it is necessary to insert a line after every five input lines, LINLEFT will be calculted as 2). If LINLEFT is zero, it is reset to one in an attempt to have at least one line of real data at the beginning of the output image (i.e. to be processed after the last inserted line is added). EXTRA, the number of lines to be inserted given the value of LINLEFT selected, is then calculated. If the number of lines to be inserted is greater than or equal to the number of input lines then an enlargement by a factor of two is the closest approximation possible to the desired enlargement. In these cases, since the last line of the output image is to be copied from the input image, the first line of the output image (the last line created) must be an inserted line, so LINLEFT is reset to zero. If EXTRA is greater than IROWS it is also necessary to reduce EXTRA so that exactly IROWS rows will be inserted.

If EXTRA is found to be zero, then the most appropriate enlargement is no enlargement at all. In this case the original image must be copied to the output image area if the enlargement is not in situ, and processing is complete.

The next step is the initialization of the counter TINC so as to force the insertion of a final inserted line immediately before the last LINLEFT input lines. One way to cause the insertion of the line at the required place is to ensure that TINC will have the value THRESH after IROWS-LINLEFT-1 rows have been processed; the next increment will cause TINC to exceed THRESH, and a line will therefore be inserted. After IROWS-LINLEFT-1 lines have been processed, TINC will have been incremented by INC*(IROWS-LINLEFT-1) for the input lines copied and decremented by SCALE*(EXTRA-1) for the EXTRA-1 lines inserted. Thus, the objective is to have

THRESH=TINC+(INC*(IROWS-LINLEFT-1)−(SCALE*(EXTRA-1))

where TINC is the initial value of the counter. Solving for TINC,

TINC=THRESH+(SCALE*(EXTRA−1))−−(INC*(IROWS−LINLEFT−1))

as shown in the flowchart.

With this line insertion method, expansion factors that are the ratios of small integers lead to exact periodicities in the insertion of lines.

The line fill method used to set the bits in the inserted lines operates as follows:
previous line—a b c d e
inserted line—o o x o o
following line—f g h i j x is the bit to be filled in; the o's are inserted blanks in the same line and do not participate in the decision to set x. a, b, c, d, e, f, g, h, i and j are the bits bordering on the bit to be filled in. Bit x is set as follows:
1. If c=h, then x is set to c; otherwise
2. If a and j are both one, x is set to one; otherwise
3. If b and i are both one, x is set to one; otherwise
4. If d and g are both one, x is set to one; otherwise
5. If e and f are both one, x is set to one; otherwise
6. x is set to zero.

The line fill method operates on four bytes (one word) of input at a time from each of the rows adjacent to the row being filled in, and produces two bytes (one halfword) of output corresponding to the middle two bytes of input. The two end bytes are discarded because some of the bits in those bytes require data from additional input words to complete the calculation. Note that if the 20 bits directly above or below the halfword to be filled in are all zero, then the halfword to be filled in must be zero, since there is no vertical or diagonal line through any bit in the halfword which does not contain a zero bit. By checking to see if the logical AND of the word above or below the halfword to be filled in with the value X'03FFFFC0' is zero, we can omit the calculation of the new halfword in most cases, since typical images contain large areas of all white (zero) pels. Because the expansion rows are zeroed when they were inserted, it is not even necessary to store the zero halfwords in this case. Since the calculation and storage of the halfwords is very time-consuming, the omission of these steps for most of the image decreases the execution time for the method dramatically. In this preferred embodiment of the line fill method according to the present invention, only the bits in the line below the line to be filled in are tested, it is assumed that if any of those bits are nonzero, the bits on the line above are likely to be nonzero also.

To describe the loop which performs the tests described above and calculates the new halfwords, first define the following variables:

IX—Index (in bytes) of the next output halfword to be calculated
OCOLS—Number of bytes per image line
H—Vector of output halfwords, indexed by IX
W—Vector of input words, indexed by IX. W refers to the words on the line below the line to be filled in. The W vector begins one byte before the beginning of the H vector, so that W(N) is one of the words used to calculate H(N) for any value N of IX.

A simple control loop to create one output line is as follows:

```
begin
if IX < OCOLS
if W(IX) & X'03FFFFC0'−=0
create output halfword H(IX)
end
IX = IX + 2
repeat
end
end
```

This loop requires the testing of one word of input each time IX is incremented by two. Note, however, that a long string of zero bits may be skipped over by examining the entire word (rather than only the middle 20 bits) and incrementing IX by four for each zero word found after the first. This means that if the word W(IX) contains all zero bits, execute the following:

```
IX = IX − 2
begin
```

```
    IX = IX + 4
    if W(IX+2) = 0
    repeat
  end
end
```

When this loop is left, W(IX+2) is nonzero and W(IX) may be nonzero. Then test the middle bits of W(IX) to determine whether they are zero, and thus whether H(IX) must be calculated.

The flowchart in FIG. 4 shows the control code used in the preferred embodiment of the method according to the present invention to fill in one line of the output image. In addition to the variables described above, a temporary variable called X is used. The appearance of a "*" after an element of W indicates that only the middle twenty bits of the word are to be considered, i.e. W(IX)* is equivalent to (W(IX) AND X'03FFFFC0').

At the beginning of the line, the index is set to zero. The input word corresponding to the first output halfword is tested to see if its middle bits are all zero. If not, then control goes to the top of the loop which creates a halfword. This involves testing to ensure that the end of the line has not been reached (and leaving the loop if it has), performing the necessary calculation, storing the resulting halfword, and incrementing IX to address the next output halfword. The input word corresponding to the next output halfword is then tested to see if its middle bits are zero; if not, the loop repeats.

If, at either the beginning of a line or after a halfword of output has been created, the middle bits of the input word corresponding to the next output halfword are all zero, the calculation of the next output halfword H(IX) is omitted. A test is made to see if there are enough zero bits to justify entering a loop similar to the one described earlier to skip an output word for each zero input word found. This test is done by taking the logical OR of the two input words corresponding to H(IX+2) and H(IX+6). If this result is zero, the H(IX+2), H(IX+4), and H(IX+6) are all zero, and so IX is incremented by 4 and the loop to skip zero words is entered. This loop begins by incrementing IX by 4, so that IX addresses the halfword which was H(IX+8) before the test. A test is made to see if the end of the line has been reached, and the loop is left if it has. Otherwise, the word W(IX+2) is examined. At this point the high-order half of W(IX) is zero, since it was checked either before entry to the loop or in a previous iteration of the loop. Therefore if W(IX+2) is zero there are six zero bytes, guaranteeing that H(IX) and H(IX+2) are both zero. The loop then repeats.

If exit occurs from the loop which tests for zero words before the end of the line is reached, W(IX+2) is nonzero, and W(IX) may be nonzero. The middle 20 bits of W(IX) are tested, and if they are zero, IX is incremented by two to avoid calculating a zero output halfword. In either case, the loop which calculates an output halfword for the index IX is entered.

If an input word is encountered whose middle 20 bits are zero, but which is not followed by a series of zero bits long enough to cause entry to the loop which skips zero words, then one or more of W(IX+2)*, W(IX+4)*, W(IX+6)*, and W(IX+8)* are nonzero (since W(IX+2) or W(IX+6) is nonzero and the high-order 10 bits of W(IX+2) are zero since they are part of W(IX)*, which is known to be zero). IX is incremented by 2, since it has been determined that H(IX) must be zero. W(IX+2)*, W(IX+4)*, and W(IX+6)* are then tested, incrementing IX by two if the word is zero (and therefore the corresponding output halfword must be zero). As soon as a nonzero value is found, control passes to the loop which calculates the output halfword for the current value of IX. If all three words are zero, then W(IX+8)* must be nonzero, so control passes without testing to the loop which calculates an output halfword. No tests are made in this portion of the code to determine whether the end of a line has been reached, since no harm is done by reading a few extra words, and the test is made before the output halfword is calculated and written out.

The calculations performed in computing the output halfword are illustrated in FIG. 5. In the figure, boxes marked "line 1" denote a word from the line above; boxes marked "line 3" denote a word from the line below. All operations illustrated in the figure are performed on word width variables. However, the result, denoted "((a&j)|(e&f)|(b&i)|(d&g)|(c&h))&(c|h)", is only correct for the middle 28 bits. Only the middle halfword is stored as the result. This halfword is selected by shifting the word right by eight bits and using a "store halfword" instruction.

The procedure just described for setting inserted bits works well for small enlargement factors (between 1.0 and 1.5). However, it has the property that if it is applied to a black line a single pel thick, the line will not become thicker. This is a disadvantage when large scale factors (between 1.5 and 2.0) are used, since it is desirable in such cases to have one-pel-thick lines enlarged to become two-pel-thick lines. This may be accomplished by modifying the line fill algorithm. One possible procedure is to OR one of the vertically adjacent words into the data to be placed in the inserted line. The line ORd in for a particular inserted line must be the same line tested to determine whether it contains all zero bits, or else the output line must originally be filled with data copied from the input line being ORd in, to avoid skipping the line fill calculation and therefore not storing a correct result if 1 bits are to be ORd into the result.

ADVANTAGES

The method according to the present invention has several advantages.
1. The quality of the enlarged image is very good.
2. It is fast. Enlargements by factors less than or equal to 2.0 can be performed in less than one second of 3081 virtual CPU time for most facsimile images.

Thus, while the invention has been described with reference to preferred embodiments thereof, it will be understood by those skilled in the art that various changes in form and details may be made without departing from the scope of the invention.

What is claimed is:

1. A method for enlarging a binary digital image along two orthogonal axes by factors of F1 and F2, respectively, comprising the steps of:
   storing said image in raster scan order in an input storage area in a computer;
   rotating said stored image by rearranging the raster data representing said stored image to create a representation of the image in raster scan order with the one of said axes originally oriented horizontally rotated in a first direction by ninety degrees;
   inserting one or more rows of expansion bits along said one of said orthogonal axes of said rotated image to convert i rows of bits to j rows of bits, where i<j<=2i, and assigning a value to each expansion bit inserted by the steps as follows:
(1) initializing a counter to a value between T−S and T, where T is an integer selected as a threshold value and S is an integer such that the rounded value of (F1−1)*S is not equal to zero;
(2) processing the stored image by the steps of:
  (a) incrementing said counter by I, where I is an integer equal to the rounded value of (F1−1)*S;
  (b) copying a first row of said stored image from said input storage area into an output storage area in which the enlarged image is to be stored;
  (c) comparing the counter value to T;
  (d) if the counter value is not between T−S and T, then
    (i) inserting a row of bits in the output storage area adjacent to said copied first row;
    (ii) assigning values to all the bits in said inserted row based upon the values of the bits in at least one neighboring row of said first row in said input storage area;
    (iii) decrementing the counter by S; and
  (e) if the counter value is between T−S and T, then omitting said steps (i), (ii), and (iii);
(3) repeating said processing steps (a)–(e) until all rows of the stored image have been processed; then
(4) replicating in said output storage area the last remaining stored image row in said input storage area if the limit of said output storage area has not been reached;
repeating said step of inserting and assigning a predetermined number of times to achieve an enlargement by a factor of F1 along said one orthogonal axis;
rotating said enlarged image in said output storage area by rearranging the raster data representing said enlarged image to create a representation of the image in raster scan order with said one orthogonal axis rotated in a second direction opposite said first direction by ninety degrees;
inserting one or more rows of expansion bits along the other of said orthogonal axes in said rotated enlarged image to convert i' rows of bits to j' rows of bits, where i'<j'<=2i', and assigning a value to each expansion bit inserted by the steps as follows:
(6) initializing a counter to a value between T'−S' and T', where T' is an integer selected as a threshold value and S' is an integer such that the rounded value of (F2−1)*S' is not equal to zero;
(7) processing a first row of the rotated enlarged image by the steps of:
  (f) incrementing said counter by I', where I' is an integer equal to the rounded value of (F2−1)*S';
  (g) copying said first row into a second output storage area;
  (h) comparing the counter value to T';
  (j) if the counter value is between T'−S' and T', then
    (iv) inserting a row of bits in the second output storage area adjacent to said copied first row;
    (v) assigning values to all the bits in said inserted row based upon the values of the bits in at least one neighboring row of said first row in said output storage area;
    (vi) decrementing the counter by S'; and
  (k) if the counter value is between T'−S' and T', inclusive, then omitting said steps (iv), (v), and (vi);

(8) repeating said processing steps (f)–(k) until all rows of the rotated enlarged image have been processed;
(9) replicating in said second output storage area the last remaining stored image row in said output storage area if the limit of said second output storage area has not been reached; and
repeating said step of inserting and assigning along said other orthogonal axis a predetermined number of times to achieve an enlargement by a factor of F2 along said other orthogonal axis.

2. A method according to claim 1 further comprising the step of storing said enlarged image by assigning said enlarged image to an area of storage beginning at the same position as the input storage area in which said image was originally stored.

3. A method according to claim 1 further comprising the step of storing said enlarged image by assigning said enlarged image to an area of storage separate from the input storage area in which said image was originally stored.

4. A method according to claim 1 wherein said first row is the bottom row of the image and is copied to the end of said output storage area;
  said inserted row is inserted into said output storage area immediately preceding said copied bottom row; and
  the remaining rows of the image in said input storage area and any other inserted rows are copied into said output storage area moving from the bottom of the image and the end of the output storage area toward their beginnings until the top row of the stored image is copied.

5. A method for enlarging a binary digital image along one of two orthogonal axes by any factor F greater than 1.0 and less than or equal to 2.0, comprising the steps of:
storing said image in raster scan order in an input storage area of a computer,
initializing a counter to a value between T−S and T, where T is an integer selected as a threshold value and S is an integer such that the rounded value of (F−1)*S is not equal to zero;
processing a first line of the stored image by the steps of:
  (a) incrementing said counter by I, where I is an integer equal to the rounded value of (F−1)*S;
  (b) copying said first line into an output storage area in which the enlarged image is to be stored;
  (c) comparing the counter value to T;
  (d) if the counter value is not between T−S and T, then
    (i) inserting a line of bits in the output storage area adjacent to said copied first line;
    (ii) assigning values to all the bits in said inserted line based upon the values of the bits in at least one neighboring line of said first line in said input storage area;
    (iii) decrementing the counter by S; and
  (e) if the counter value is between T−S and T, then omitting said steps (i), (ii), and (iii);
repeating said processing steps (a)–(e) on the other lines of the stored image until no more image lines in said input storage area remain to be processed; and
replicating in said output storage area the last remaining image line in said input storage area if the limit of said output storage area has not been reached.

6. A method according to claim 5 wherein said first line is the bottom line of the image and is copied to the end of said output storage area;

said inserted line is inserted into said output storage area immediately preceding said copied bottom line; and the remaining lines of the image in said input storage area and any other inserted lines are copied into said output storage area moving from the bottom of the image and the end of the output storage area toward their beginnings until the top line of the stored image is copied.

7. A method for enlarging a binary digital image along one of two orthogonal axes by any factor F, comprising the steps of:

storing said image in raster scan order in an input storage area of a computer;

rotating said stored image in said input storage area by rearranging the raster data representing said stored image to create a representation of the image in raster scan order with said one of said orthogonal axes rotated in a first direction by ninety degrees; inserting one or more rows of expansion bits along said one of said orthogonal axes of said rotated image to convert i rows of bits to j rows of bits, where $i < j < = 2i$, and assigning a value to each expansion bit inserted by the steps as follows:

(1) initializing a counter to a value between T−S and T, where T is an integer selected as a threshold value and S is an integer such that the rounded value of (F−1)*S is not equal to zero;

(2) processing the stored image by the steps of:
 (a) incrementing said counter by I, where I is an integer equal to the rounded value of (F−1)*S;
 (b) copying a first row of said stored image from said input storage area into an output storage area in which the enlarged image is to be stored;
 (c) comparing the counter value to T;
 (d) if the counter value is not between T−S and T, then
  (i) inserting a row of bits in the output storage area adjacent to said copied first row;
  (ii) assigning values to all the bits in said inserted row based upon the values of the bits in at least one neighboring row of said first row in said input storage area;
  (iii) decrementing the counter by S; and
 (e) if the counter value is between T−S and T, then omitting said steps (i), (ii), (iii);

(3) repeating said processing steps (a)–(e) until all rows of the stored image have been processed; then (4) replicating in said output storage area the last remaining stored image row in said input storage area if the limit of said output storage area has not been reached;

repeating said step of inserting and assigning a predetermined number of times to achieve an enlargement by a factor of F along said one orthogonal axis; and rotating said enlarged image in said output storage area by rearranging the raster data representing said enlarged image to create a representation of the image in raster scan order with said one of said orthogonal axes rotated in a second direction opposite said first direction by ninety degrees.

8. A method according to claim 7 wherein said first row is the bottom row of the image and is copied to the end of said output storage area;

said inserted row is inserted into said output storage area immediately preceding said copied bottom row; and the remaining rows of the image in said input storage area and any other inserted rows are copied into said output storage area moving from the bottom of the image and the end of the output storage area toward their beginnings until the top row of the stored image is copied.

9. A system for enlarging a binary digital image along one of two orthogonal axes by any factor F greater than 1.0 and less than or equal to 2.0 comprising:

input storage area means, in a computer, for storing said image in raster scan order;

a counter;

means for initializing said counter to a value between T−S and T, where T is an integer selected as a threshold value and S is an integer such that the rounded value of (F−1)*S is not equal to zero;

means for processing a first line of the stored image, comprising:
 (1) means for incrementing said counter by I, where I is an integer equal to the rounded value of (F−1)*S;
 (2) output storage area means for storing the enlarged image;
 (3) means for copying said first line into said output storage area means;
 (4) means for comparing the counter value to T;
 (5) means, if the counter value is not between T−S and T, for inserting a line of bits in the output storage area means adjacent to said first line and assigning values to all the bits in said inserted line based upon the values of the bits in at least one neighboring line to said first line in said input storage area means;
 (6) means for decrementing the counter by S after each operation of said line of bits inserting means; and
 (7) means, if the counter value is between T−S and T, for avoiding the operation of said line of bits inserting means;

means for repeating the operation of said processing means on the other lines of the stored image until no more image lines in said input storage area means remain to be processed; and means for replicating in said output storage area means the last remaining image line in said input storage area, if the limit of said output storage area means has not been reached.

10. A system according to claim 9 further comprising means for storing the enlarged image in an area of storage in the computer beginning at the same position as said input storage area means in which said image was originally stored.

11. A system according to claim 9 wherein said copying means copies the bottom line of the image as said first line to the end of said output storage area means;

said inserting means inserts said inserted line into said output storage area means immediately preceding said copied bottom line; and said copying means copies the remaining lines of the image in said input storage area means and said inserting means inserts any other inserted lines into said output storage area means moving from the bottom of the image and the end of the output storage area means toward their beginnings until the top line of the stored image is copied.

12. A system for enlarging a binary digital image along one of two orthogonal axes by any factor F, comprising:

input storage area means, in a computer, for storing said image in raster scan order;

output storage area means, in said computer, for storing the enlarged image;

means for rotating said stored image in said input storage area means by rearranging the raster data representing said stored image to create a representation of the stored image in raster scan order with said one of said orthogonal axes rotated in a first direction by ninety degrees;

means for inserting one or more rows of expansion bits along said one of said orthogonal axes of said rotated image to convert i rows of bits to j rows of bits, where $i<j<=2i$, and assigning a value to each expansion bit so inserted, comprising:

(1) a counter;

(2) means for initializing said counter to a value between $T-S$ and T, where T is an integer selected as a threshold value and S is an integer such that the rounded value of $(F-1)*S$ is not equal to zero;

(3) means for processing a first row of the stored image, comprising:

(a) means for incrementing said counter by I, where I is an integer equal to the rounded value of $(F-1)*S$;

(b) means for copying said first row into said output storage area means;

(c) means for comparing the counter value to T;

(d) means, if the counter value is not between $T-S$ and T, for inserting a row of bits in the output storage area means adjacent said copied first row and assigning values to all the bits in said inserted row based upon the values of the bits in at least one neighboring row of said first line in said input storage area;

(e) means for decrementing the counter by S after each operation of said row of bits inserting means; and (f) means, if the counter value is between $T-S$ and T, for avoiding the operation of said row of bits inserting means;

(4) means for repeating the operation of said processing means on the other lines of the image in said input storage area means until no more image rows remain to be processed;

(5) means for replicating in said output storage area means the last remaining image row in said input storage area means if the limit of said output storage area means has not been reached;

means for actuating said inserting and assigning means a predetermined number of times to achieve an enlargement by a factor of F along said one orthogonal axis; and means for rotating said enlarged image in said output storage area means by rearranging the raster data representing said enlarged image to create a representation of the image in raster scan order with said one of said orthogonal axes rotated in a second direction opposite said first direction by ninety degrees.

13. A system according to claim 12 further comprising means for storing the enlarged image in an area of storage in the computer beginning at the same position as said input storage area means in which said image was originally stored.

14. A system according to claim 12 wherein said copying means copies the bottom row of the image as said first row to the end of said output storage area means;

said inserting means inserts said inserted row into said output storage area means immediately preceding said copied bottom row; and said copying means copies the remaining rows of the image in said input storage area means and said inserting means inserts any other inserted rows into said output storage area means moving from the bottom of the image and the end of the output storage area means toward their beginnings until the top row of the stored image is copied.

* * * * *